United States Patent
McNeil et al.

[11] Patent Number: 6,082,134
[45] Date of Patent: Jul. 4, 2000

[54] PROCESS AND APPARATUS FOR SEPARATING A GASEOUS MIXTURE

[75] Inventors: Brian Alfred McNeil, Chessington; Alan Geoffrey Truscott, Aberdeen, both of United Kingdom

[73] Assignee: Air Products and Chemicals, Inc., Allentown, Pa.

[21] Appl. No.: 09/120,409

[22] Filed: Jul. 22, 1998

[30] Foreign Application Priority Data

Jul. 29, 1997 [GB] United Kingdom ............. 9715983

[51] Int. Cl.[7] ................................. F25J 1/00
[52] U.S. Cl. .................... 62/632; 62/631; 62/920; 62/932
[58] Field of Search .................. 62/631, 632, 920, 62/932

[56] References Cited

U.S. PATENT DOCUMENTS

| | | | |
|---|---|---|---|
| 3,813,889 | 6/1974 | Allam et al. | 62/22 |
| 4,478,621 | 10/1984 | Fabian | 62/920 |
| 4,888,035 | 12/1989 | Bauer | 62/20 |
| 5,295,356 | 3/1994 | Billy | 62/20 |
| 5,592,831 | 1/1997 | Bauer et al. | 62/625 |

FOREIGN PATENT DOCUMENTS 1579553  11/1980  United Kingdom ........... B01D 53/14

*Primary Examiner*—Ronald Capossela
*Attorney, Agent, or Firm*—Willard Jones, II

[57] ABSTRACT

Hydrogen (4), and carbon monoxide (21) are separated from a gaseous mixture thereof, typically a mixture of essentially hydrogen, carbon monoxide and methane (1) using liquid methane (3) to dissolve carbon monoxide in a methane wash column (2), removing (8) residual hydrogen (15) from the loaded methane wash (6,9), and separating (18) the residual loaded methane into carbon monoxide and methane fractions (21,22). The residual hydrogen (15) is removed in a hydrogen stripping column (8), said column being refluxed with a methane rich scrubbing liquid stream (13) withdrawn from an intermediate location of the methane wash column (2).

13 Claims, 1 Drawing Sheet

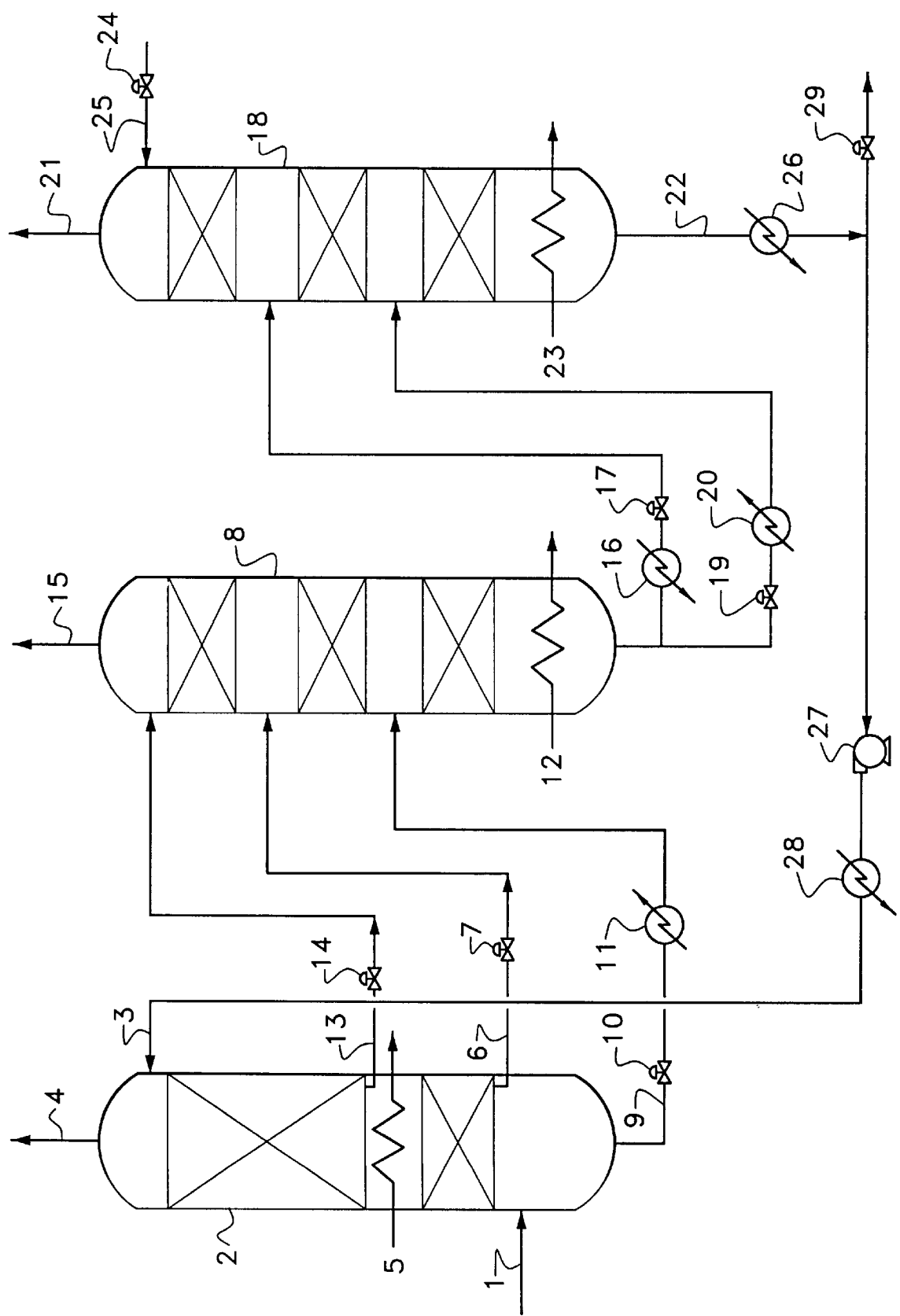

6,082,134

PROCESS AND APPARATUS FOR SEPARATING A GASEOUS MIXTURE

TECHNICAL FIELD OF THE INVENTION

This invention relates to a process and apparatus for separation of hydrogen and carbon monoxide from gaseous mixtures thereof and has particular, but not exclusive, application to mixtures comprising essentially hydrogen ($H_2$), methane ($CH_4$) and carbon monoxide (CO).

BACKGROUND OF THE INVENTION

A conventional process for separating hydrogen and carbon monoxide comprises a low temperature scrubbing step using liquid methane to dissolve carbon monoxide, a hydrogen stripping column or flash separator to separate hydrogen from the CO-loaded methane (containing about 3%–4% $H_2$), and a carbon monoxide/methane separation column to separate the hydrogen-stripped CO-loaded methane into carbon monoxide and methane fractions. The hydrogen stripping column normally operates at an intermediate pressure to the methane wash and carbon monoxide/methane separation columns.

GB-A-1,579,553 discloses a said conventional process in which the CO-loaded methane is countercurrently contacted with hydrogen-rich vapour generated by warming the hydrogen-stripped CO-loaded methane internally or externally of the hydrogen stripping column.

U.S. Pat. No. 5,295,356 discloses a said conventional process in which the columns are heated and/or cooled by a closed refrigerating cycle, preferably a nitrogen cycle.

U.S. Pat. No. 5,592,831 discloses a said conventional process in which the methane wash is conducted with methane containing at least 2 to 15 mol % carbon monoxide. In the exemplified embodiment, the methane scrubbing column and hydrogen stripper are combined into a single column and the hydrogen-stripped CO-loaded methane is fed to the carbon monoxide/methane separation column partly as a subcooled liquid and the remainder after vaporization.

A major problem with the conventional process is that a significant amount of carbon monoxide is lost in the overhead ("reject hydrogen") stream from the hydrogen stripping column or flash separator. This problem has been solved in the past by recycling the reject hydrogen stream to recover the carbon monoxide (and hydrogen), or by washing the reject hydrogen stream with essentially pure liquid methane recycled from the sump of the carbon monoxide/methane separation column to dissolve and recover most of the carbon monoxide (as described in U.S. Pat. No. 4,888,035).

BRIEF SUMMARY OF THE INVENTION

It is an object of the present invention to reduce losses of carbon monoxide with the reject hydrogen stream with lower power consumption than said prior art methods.

The Inventors have now found that impure methane withdrawn from an intermediate location above the bottom stage of the methane wash column can be used to provide reflux to the top of the hydrogen stripping column and thereby reduce losses of carbon monoxide in the reject hydrogen stream. Compared to the process of U.S. Pat. No. 4,888,035 (which uses essentially pure regenerated methane from the bottom of the carbon monoxide/methane separation column as reflux), the present invention results in a reduction in the total amount of methane reflux required for the columns, and a consequent reduction in heat pump power. In particular, whereas in U.S. Pat. No. 4,888,035 the reflux methane is fairly pure (since it is withdrawn from the bottom of the carbon monoxide/methane separation column), the present invention uses a methane-rich stream that has already been used to provide part of the scrubbing duty in the methane-wash column, and usually contains up to about 10% CO, but it can be up to about 15% CO. For the same CO content in the reject hydrogen stream, this increases the amount of reflux needed for each of the methane wash and hydrogen-stripping columns but the total amount of reflux is reduced since it is employed in series. Consequently the recycle heat pump (typically carbon monoxide) flowrate required for the carbon monoxide/methane column separation is reduced, resulting in a product/recycle carbon monoxide compressor power reduction typically of about 2% to 4%.

BRIEF DESCRIPTION OF THE DRAWING

The single FIGURE of the accompanying drawing is a schematic representation of a preferred embodiment of the process and apparatus of the invention.

DETAILED DESCRIPTION OF THE INVENTION

Accordingly in a first aspect of the invention, there is provided a process for separating hydrogen and carbon monoxide from a gaseous mixture thereof, said process comprising:

(a) scrubbing the gaseous mixture or a gaseous fraction thereof with a liquid methane wash stream in a methane wash column to provide a gaseous hydrogen product stream and a liquid CO-loaded methane stream;

(b) separating said CO-loaded methane stream into a gaseous hydrogen-rich stream and a liquid CO/methane stream in a hydrogen stripping column refluxed with a methane-rich liquid;

(c) separating said CO/methane stream into a gaseous carbon monoxide stream and a liquid methane stream; and (d) recycling at least part of the liquid methane stream separated from the carbon monoxide stream in step (c) to provide the wash liquid for step (a);

wherein said methane-rich liquid stream is withdrawn from an intermediate location of the methane wash column above the level of removal of said liquid CO-loaded stream therefrom.

In a second aspect of the invention there is provided an apparatus for separating hydrogen and carbon monoxide from a gaseous mixture thereof by a process of the first aspect, said apparatus comprising:

(a) a methane wash column;

(b) a hydrogen stripping column;

(c) a carbon monoxide/methane separation column;

(d) conduit means for feeding liquid CO-loaded methane from a lower location of the methane wash column to the hydrogen stripping column;

(e) conduit means for feeding methane-rich liquid from an intermediate location of the methane wash column to an upper location of the hydrogen stripping column;

(f) conduit means for feeding liquid CO/methane from a lower location of the hydrogen stripping column to the carbon monoxide/methane separation column; and (g) conduit means for recycling liquid methane from the carbon monoxide/methane separation column to the methane wash column.

The process can also suitably separate gaseous mixtures comprising hydrogen, carbon monoxide and methane, and most suitably will separate a gaseous mixture consisting essentially of these gases.

Preferably a heat exchange means is also provided which is in communication with the methane wash column. The gaseous mixture is then advantageously partially condensed into a gaseous and liquid fraction and at least part of the gaseous fraction fed to the methane wash column for scrubbing. The liquid fraction could be separately fed to another part of the process. However, preferably both the liquid and gaseous fractions are fed to the methane wash column. With this arrangement, a further liquid fraction can be taken off (by further conduit means) at a location below the liquid CO-loaded methane stream and fed directly into the hydrogen stripping column, or combined with the liquid CO-loaded methane stream and then fed into the hydrogen stripping column.

Preferably at least one heat exchanger is associated with the methane wash column to remove the heat of solution, and is located below the location of withdrawal of the methane rich liquid. More preferably more than one heat exchanger is provided and the methane rich liquid is withdrawn from a location above the uppermost heat exchanger.

The methane rich liquid could be withdrawn from any stage of the methane wash column above the bottom stage but preferably from the stage above said (uppermost) heat exchanger. However, it may be withdrawn from a higher stage than said preferred location if lower carbon monoxide losses are desired, since liquid from higher up the column will have a lower carbon monoxide content.

Advantageously the liquid CO/methane stream from step (b) is split into at least two streams, the first is subcooled and the subcooled liquid introduced into a carbon monoxide/methane separation column of step (c), and the second stream is at least partially vaporised and introduced into said separation column at a location below that of said subcooled liquid.

Accordingly in the apparatus the conduit means for feeding liquid CO/methane from the hydrogen stripping column to the carbon monoxide/methane separation column comprises at least two branches debouching into said separation column at vertically spaced locations, and advantageously the branch debauching at the high location includes a heat exchanger for sub-cooling the liquid therein, and the branch debauching into the separation column at the lower location includes a heat exchanger for warming and at least partially vaporising the liquid therein. This arrangement has the advantage over a single conduit inlet in that lower reboiler duty is required for the carbon monoxide/methane separation column.

The invention will now be described by way of example only with reference to the accompanying drawing which is a schematic representation of a preferred embodiment of the process and apparatus of the invention.

With reference to the attached process flow diagram, partially condensed crude synthesis gas (partially condensed such as by a heat exchanger—not shown, into a gaseous and liquid fraction) is fed via conduit 1 to the bottom of methane wash column 2. The vapour rising up through the wash column trays or packing is scrubbed with liquid methane introduced at the top of the column via conduit 3. This dissolves carbon monoxide into the liquid methane and produces an overhead hydrogen product in conduit 4, containing only small quantities of carbon monoxide and methane. The heat of solution of carbon monoxide in the wash liquid is typically removed by indirect heat exchange with at least part of a liquid carbon monoxide heat pump stream in heat exchanger(s) 5. This can be accomplished by at least one contactor heat exchanger as described in U.S. Pat. No. 3,813,889 (incorporated herein by reference) and is shown only schematically here. The number of contactor heat exchangers, their position and configuration within the methane wash column stages, is such as to most economically provide near isothermal operation of the column.

The loaded liquid carbon monoxide/methane mixture from the bottom stage of the methane wash column, (which typically contains about 3% to 4% $H_2$), is removed via conduit 6, reduced in pressure by control valve 7, and introduced into hydrogen stripping column 8, containing trays or packing, where hydrogen is stripped from the liquid in order to achieve the required carbon monoxide product purity specification. Condensed liquid (the liquid fraction) in the crude synthesis gas feed is removed from the sump of the methane wash column via conduit 9, reduced in pressure by control valve 10, and partly vaporised in heat exchanger 11, preferably by indirect heat exchange with at least part of the crude synthesis gas upstream of conduit 1. Alternatively other heat exchange means could be provided. The partly vaporised liquid is then fed to hydrogen stripping column 8 several stages below the introduction of the liquid in conduit 6 to provide part of the stripping vapour for hydrogen removal from the latter stream. A reboiler 12 in the bottom of the hydrogen stripping column provides stripping vapour for the liquid in both feed streams. The liquid introduced via conduit 6 also serves to scrub some of the carbon monoxide from the vapour passing through the hydrogen stripping column. A methane rich scrubbing liquid is withdrawn from an appropriate stage of the methane wash column via conduit 13, reduced in pressure by control valve 14, and used to provide wash liquid to the top of the hydrogen stripping column 8 to further reduce carbon monoxide losses in the reject hydrogen stream from conduit 15.

Liquid from the bottom of the hydrogen stripping column 8 is divided in two branch streams. The first stream is subcooled in heat exchanger 16, reduced in pressure by control valve 17, and introduced to the carbon monoxide/methane separation column 18. The second stream is reduced in pressure by control valve 19, partially vaporised in heat exchanger 20, and also introduced to the carbon monoxide/methane separation column 18 several stages below the subcooled liquid from heat exchanger 16. The two feeds are separated in the carbon monoxide/methane separation column 18 into carbon monoxide and methane streams in conduits 21 and 22 respectively. The column is reboiled by reboiler 23, and reflux is provided by direct introduction of liquid carbon monoxide via control valve 24 and conduit 25. Heat transfer in heat exchangers 16 and 20 is accomplished by indirect heat exchange with other process streams and is not detailed here.

Purified methane liquid in conduit 22 is subcooled in subcooler 26 by indirect heat exchange with other process streams, not detailed here, and then divided. The major part of stream 22 is pumped by pump 27 to methane wash column pressure, further subcooled in heat exchanger 28, and introduced to the top of the methane wash column 2 via conduit 3. The minor portion of stream 22 is removed from the distillation system via control valve 29. Table 1 summarises a mass balance for a typical application of this invention.

TABLE 1

| Stream | | 1 | 3 | 4 | 6 | 9 | 13 | 15 | 21 | 22 | 25 |
|---|---|---|---|---|---|---|---|---|---|---|---|
| Pressure | bar abs | 21.6 | 22.4 | 20.9 | 21.3 | 21.6 | 21.2 | 11.0 | 2.76 | 2.91 | 3.03 |
| Temperature | deg C | −169.5 | −178.8 | −176.5 | −165.7 | −169.5 | −175.7 | −171.1 | −181.6 | −147.5 | −180.8 |
| Flowrate | kgm/h | 947.5 | 338.2 | 549.6 | 515.8 | 141.0 | 79.4 | 22.0 | 441.7 | 374.1 | 101.7 |
| Hydrogen | mol % | 58.91 | | 97.91 | 2.65 | 3.49 | 1.81 | 86.68 | 0.28 | | 0.28 |
| Nitrogen | mol % | 0.14 | | 0.03 | 0.16 | 0.20 | 0.13 | 0.24 | 0.34 | | 0.34 |
| Carbon monoxide | mol % | 36.04 | 0.41 | 0.30 | 45.46 | 71.19 | 8.07 | 8.75 | 99.35 | 0.41 | 99.35 |
| Methane | mol % | 4.90 | 99.58 | 1.76 | 51.72 | 25.11 | 89.99 | 4.32 | 0.03 | 99.58 | 0.03 |
| Vapour fraction | | 0.851 | 0 | 1 | 0 | 0 | 0 | 1 | 1 | 0 | 0.105 |

The above describes a preferred embodiment of the invention, an essential feature being washing the hydrogen stripper column vapour with methane rich liquid withdrawn from an intermediate stage of the methane wash column, preferably from the stage above the uppermost contactor heat exchanger. However this liquid could be withdrawn from any stage of the methane wash column, above the bottom stage, and suitably may be withdrawn from a higher stage than the preferred location if lower carbon monoxide losses are desired, since liquid from higher up the column will have a lower carbon monoxide content.

Liquid withdrawn from the bottom stage of the methane wash column via conduit 6 is a preferred but not an essential feature, and control valve 7 could be eliminated. For example, the hydrogen stripper column could be simplified by mixing the liquid of conduit 6 with the condensed liquid (the liquid fraction) in the crude synthesis gas feed in the column sump. This may be appropriate on a smaller scale plant where the power saved by using this feature does not justify the additional cost.

Heat exchangers 11, 16, and 20 are preferably present and are generally accepted as being cost effective even for small plants. The scrubbing liquid methane must be cold enough to satisfactorily absorb the carbon monoxide in the methane wash column, and such subcooling is advantageously achieved by at least one heat exchanger and preferably two, such as exchangers 26 and 28, communicating with the recycled methane.

In an alternative embodiment the liquid from the bottom of the hydrogen stripping column 8 may be subcooled in heat exchanger 16, and then divided into two branch streams. The first stream would feed the carbon monoxide/methane separation column 18 and the second stream would be reduced in pressure and partially vaporised in eat exchanger 20, before feeding to the carbon monoxide/methane separation column 18 at a lower location than said first stream.

Optionally, the heat of solution may be removed by indirect heat exchange with at least part of a liquid carbon monoxide heat pump stream in a contractor heat exchanger located at the top of the hydrogen stripping column. This may be a cost effective means of achieving higher carbon monoxide recovery or reducing the quantity of methane rich liquid used for washing.

For cases where the hydrogen specification of the carbon monoxide product is less stringent, or where hydrogen would be removed in a downstream nitrogen/carbon monoxide separation column, the hydrogen stripping column reboiler and bottom section of stages may not be required.

From the foregoing description, one skilled in the art can easily ascertain the essential characteristics of this invention, and without departing from the spirit and scope thereof, can make various changes and modifications of the invention to adapt it to various usages and conditions.

What we claim is:

1. In a process for separating hydrogen and carbon monoxide from a gaseous mixture thereof comprising:
   (a) scrubbing the gaseous mixture or a gaseous fraction thereof with a liquid methane wash stream in a methane wash column to provide a gaseous hydrogen product stream and a liquid CO-loaded methane stream;
   (b) separating said CO-loaded methane stream into a gaseous hydrogen-rich stream and a liquid CO/methane stream in a hydrogen stripping column refluxed with a methane-rich liquid;
   (c) separating said CO/methane stream into a gaseous carbon monoxide stream and a liquid methane stream; and
   (d) recycling at least part of the liquid methane stream separated from the carbon monoxide stream in step (c) to provide the wash liquid for step (a);
   the improvement consisting in that said methane-rich liquid stream is withdrawn from an intermediate location of the methane wash column above the level of removal of said liquid CO-loaded stream therefrom.

2. The process according to claim 1, wherein said gaseous mixture consists essentially of carbon monoxide, hydrogen, and methane.

3. The process according to claim 1, wherein the gaseous mixture is first partially condensed to provide a liquid and gaseous fraction and at least part of the gaseous fraction thereof fed to and scrubbed in the methane wash column of step (a).

4. The process according to claim 3, wherein both the liquid and gaseous fraction of the gaseous mixture are fed to the methane wash column.

5. The process according to claim 4, wherein a further liquid stream is withdrawn from the methane wash column at a location below the location of withdrawal of the liquid CO-loaded methane stream and is fed to the hydrogen stripping column.

6. The process according to claim 1, wherein said methane-rich liquid stream contains up to 15% carbon monoxide.

7. The process according to claim 6, wherein said methane-rich liquid stream contains up to 10% carbon monoxide.

8. The process according to claim 1, wherein heat of solution is removed by at least one heat exchanger associated with the methane wash column below the location of withdrawal of the methane-rich liquid.

9. In an apparatus for the separation of hydrogen and carbon monoxide from a gaseous mixture thereof by a process as defined in claim 1, said apparatus comprising:
   a methane wash column;
   a hydrogen stripping column;
   a carbon monoxide/methane separation column;

conduit means for feeding liquid CO-loaded methane from a lower location of the methane wash column to the hydrogen stripping column;

conduit means for feeding liquid CO/methane from a lower location of the hydrogen stripping column to the carbon monoxide/methane separation column; and conduit means for recycling liquid methane from the carbon monoxide/methane separation column to the methane wash column, the improvement consisting in that conduit means are provided for feeding methane-rich liquid from an intermediate location of the methane wash column to an upper location of the hydrogen stripping column.

10. The apparatus according to claim 9, further comprising heat exchange means upstream of the methane wash column for partially condensing the gaseous mixture into a liquid and gaseous fraction; conduit means for feeding the resultant liquid and vapor to the methane wash column; and conduit means between the methane wash column, at a location below the location of the conduit means for withdrawal of the CO-loaded stream, and the hydrogen stripping column for feeding the liquid fraction of the partially condensed gaseous mixture.

11. An apparatus according to claim 10, wherein at least one heat exchanger is associated with the methane wash column at a location below the intermediate location of the conduit means removing the methane-rich liquid.

12. A process for separating hydrogen and carbon monoxide from a gaseous mixture consisting essentially of carbon monoxide, hydrogen, and methane comprising:

(a) scrubbing the gaseous mixture or a gaseous fraction thereof with a liquid methane wash stream in a methane wash column to provide a gaseous hydrogen product stream and a liquid CO-loaded methane stream;

(b) separating said CO-loaded methane stream into a gaseous hydrogen-rich stream and a liquid CO/methane stream in a hydrogen stripping column refluxed with a methane-rich liquid;

(c) separating said CO/methane stream into a gaseous carbon monoxide stream and a liquid methane stream; and (d) recycling at least part of the liquid methane stream separated from the carbon monoxide stream in step (c) to provide the wash liquid for step (a);

wherein said methane-rich liquid stream is withdrawn from an intermediate location of the methane wash column above the level of removal of said liquid CO-loaded stream therefrom and contains up to 15% carbon monoxide.

13. A process for separating hydrogen and carbon monoxide from a gaseous mixture consisting essentially of carbon monoxide, hydrogen, and methane comprising:

(1) partially condensing the gaseous mixture to provide a liquid and gaseous fraction and feeding both fractions to a methane wash column;

(2) scrubbing said gaseous fraction with a liquid methane wash stream in the methane wash column and withdrawing a gaseous hydrogen product stream, a liquid CO-loaded methane stream and a bottoms liquid from said column;

(3) feeding the liquid CO-loaded methane stream to an upper intermediate location of a hydrogen stripping column refluxed with a methane-rich liquid and feeding the bottoms liquid to a lower intermediate location of the hydrogen stripping column;

(4) withdrawing from said hydrogen stripping column a gaseous hydrogen-rich stream and a liquid CO/methane stream;

(5) separating said CO/methane stream into a gaseous carbon monoxide stream and a liquid methane stream; and (6) recycling at least part of the liquid methane stream separated from the carbon monoxide stream in step (5) to provide the wash liquid for step (2);

wherein said methane-rich liquid stream is withdrawn from an intermediate location of the methane wash column above the level of removal of said liquid CO-loaded stream therefrom and contains up to 15% carbon monoxide.

* * * * *